United States Patent [19]
Blach

[11] Patent Number: 5,787,766
[45] Date of Patent: Aug. 4, 1998

[54] TORQUE-SPLITTING GEAR

[76] Inventor: Josef Blach, Gartenstrasse 8, D-71732 Tamm, Germany

[21] Appl. No.: 733,685

[22] Filed: Oct. 17, 1996

[30] Foreign Application Priority Data

Oct. 18, 1995 [DE] Germany ............... 195 38 761.9

[51] Int. Cl.$^6$ ............................................... F16H 1/22
[52] U.S. Cl. ............................ 74/665 G; 74/665 GA; 74/409; 74/413; 475/248; 475/341
[58] Field of Search ................... 74/665 G, 665 GA, 74/409, 411, 410, 412, 413, 665 N, 665 M; 475/338, 339, 341, 248

[56] References Cited

U.S. PATENT DOCUMENTS

| | | | |
|---|---|---|---|
| 4,253,345 | 3/1981 | Munster | 74/665 G X |
| 4,876,908 | 10/1989 | Pengilly | 74/410 |
| 5,103,689 | 4/1992 | Dollhopf | 74/665 GA |

FOREIGN PATENT DOCUMENTS

| | | | |
|---|---|---|---|
| 0 432 349 | 12/1994 | European Pat. Off. | |
| 24 23 905 | 12/1974 | Germany. | |
| 24 41 865 | 3/1976 | Germany. | |
| 26 19 019 | 11/1977 | Germany. | |
| 26 28 387 | 12/1977 | Germany. | |
| 6-42594 | 2/1994 | Japan | 74/409 |
| 406307504 | 11/1994 | Japan | 74/409 |
| 0 669 020 | 2/1989 | Switzerland. | |

*Primary Examiner*—Khoi Q. Ta
*Attorney, Agent, or Firm*—Flynn, Thiel, Boutell & Tanis, P.C.

[57] ABSTRACT

The invention relates to a torque-splitting gear having a driving shaft and axis-parallel driven pinion shafts running in the same sense which are coupled with each other by toothed wheels. The gear is to be designed in such a way that it can be built up in different dimensions and for different powers while maintaining a great number of its components without change. The coupling between the driving shaft and the main driving toothed wheels is realized by a herringbone gearing. For transmitting great torques the main driving toothed wheels and the pinions on the driven pinion shafts are additionally coupled with each other via intermediate pinions and hollow wheels.

10 Claims, 3 Drawing Sheets

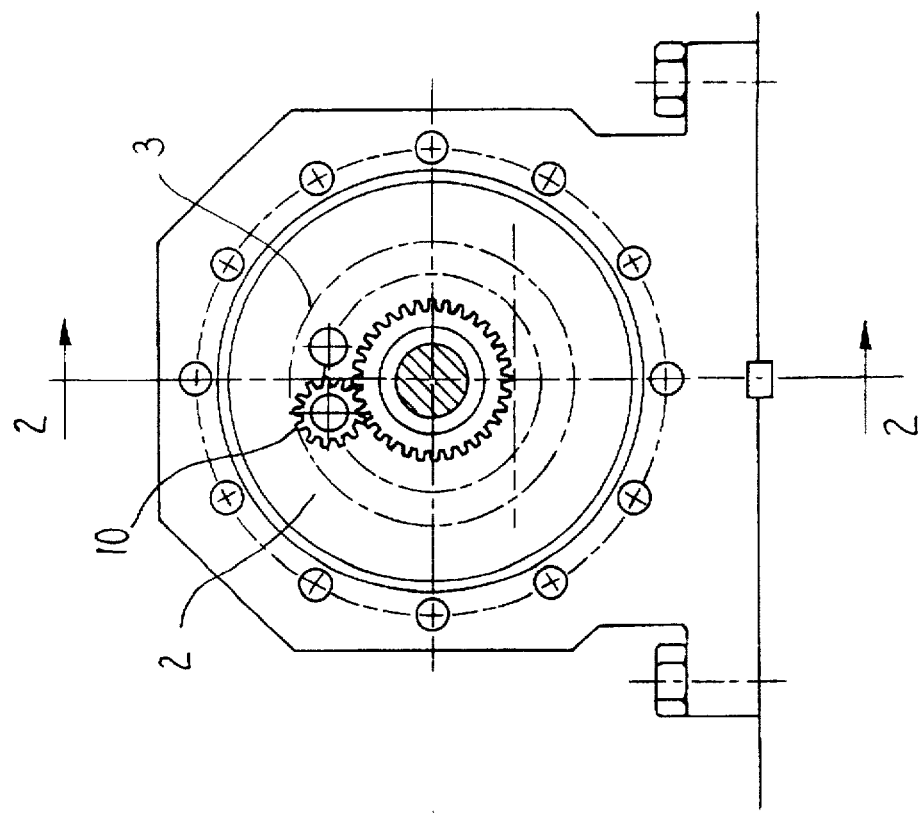
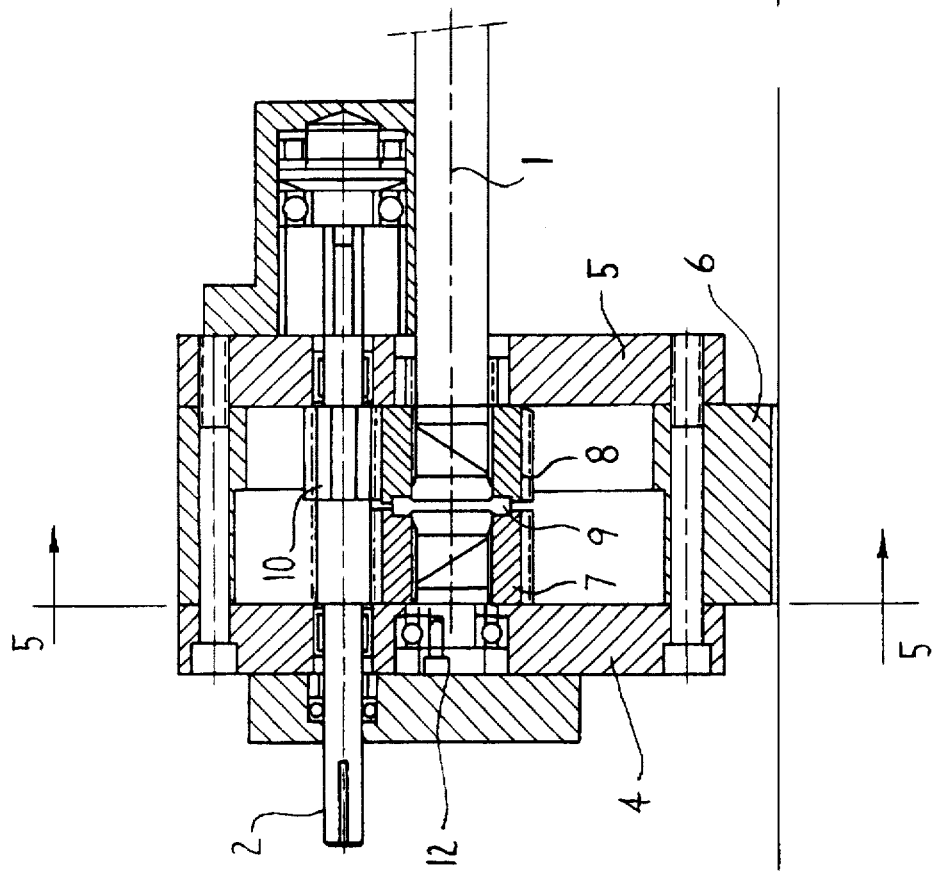

TORQUE-SPLITTING GEAR

This invention relates to a torque-splitting gear having a driving shaft and two axis-parallel driven shafts running in the same sense, the driving shaft and driven shafts being coupled positively with each other by toothed wheels disposed thereon.

Such a gear is known (EP-A-0 432 349). The known gear has a driving shaft and two axis-parallel driven shafts rotating in the same sense. The driving shaft and one of the driven shafts are formed as continuous shafts so that the output torque is transmitted directly from the driving shaft to one driven shaft. Furthermore a driving pinion is disposed on the driving shaft so as to rotate therewith, being coupled with an intermediate wheel and a freely rotating hollow wheel. The intermediate wheel and hollow wheel engage a driven pinion fastened to the second driven shaft so as to rotate therewith. The second driven shaft thus obtains one half of its output torque from the driving shaft and one half from the driving pinion via the intermediate wheel and the hollow wheel. Such known torque-splitting gears are required for example for twin screw extruders.

For these and similar purposes one requires torque-splitting gears which 1. should constitute a drive for those machines whose products to be processed have different throughput quantities and which have a different energy demand,
2. must be produced in a great number of different center distances between the driven shafts, and
3. are required for transmitting very different powers.

This means that very different gears are required in small piece numbers. That implies single-unit production or at best small-lot production, which involves relatively high production costs.

The known gear also lacks an apparatus for reliably indicating when the torque required on the two driven shafts differs very greatly. This can occur for example when a driven shaft is braked very greatly or even blocked. An apparatus indicating this state is therefore imperative for effectively protecting the gear, or the machine driven thereby, from being damaged or destroyed.

The technical problem underlying the invention is to provide a torque-splitting gear of the abovementioned type which can be built up in different center distances and for different powers in the manner of a building block system while maintaining the essential parts without changing them. Furthermore the novel gear should have an apparatus which reliably produces a signal at different load on the driven shafts.

This technical problem is solved according to the invention by gear having the following features:

a) in the operating state two driving toothed wheels are disposed in tandem on the driving shaft coupled with said shaft so as to rotate therewith and being continuously adjustable relative to each other upon assembly, b) a driven pinion shaft with a pinion meshes with each of the driving toothed wheels, c) the driving toothed wheels and the pinions are additionally coupled via one intermediate pinion in mirror-inverted arrangement with respect to the driven pinion shafts in each case and one internal geared hollow wheel in each case, d) the hollow wheels are coupled firmly with each other but designed to be continuously adjustable relative to each other in the circumferential direction upon assembly.

In the inventive gear the center distances between the driven shafts can be varied by only slightly varying the housing covers, installing different washers and for example rotating hollow wheels relative to each other in the circumferential direction. Adaptation to different torques to be transmitted is obtained by leaving out the hollow wheel and intermediate pinion.

Advantageous details of the invention are contained in claims 2 to 7. The invention will be explained in the following with reference to FIGS. 1 to 5, in which:

FIG. 4 shows a further embodiment of the novel gear in longitudinal section, and FIG. 5 shows a cross section through the gear according to FIG. 4 along cutting lien EF.

Figure 1:
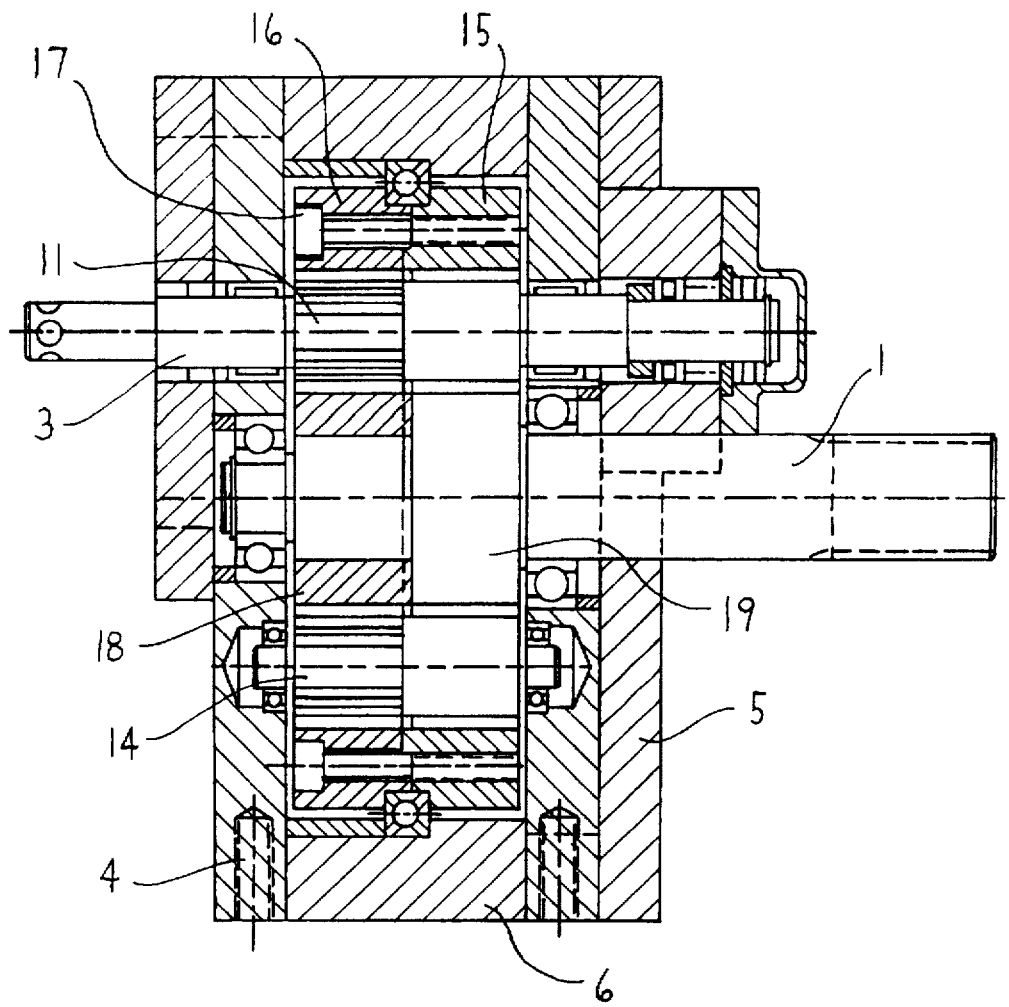
FIG. 1 shows an embodiment of the novel gear in longitudinal section.

As can be seen from FIG. 1, the gear has driving shaft 1 and driven pinion shafts 2 and 3 (of which only driven pinion shaft 3 can be seen in FIG. 1). Driving shaft 1 and driven pinion shafts 2 and 3 are mounted in housing covers 4 and 5 of the housing consisting of housing body 6 and housing covers 4 and 5. The two driving toothed wheels 18 and 19 are disposed positively or nonpositively on driving shaft 1.

Driving toothed wheels 19 and 18 engage pinions 10 and 11 disposed on driven pinion shafts 2 and 3 so as to rotate therewith. Said pinions are mutually offset axially on driven pinion shafts 2 and 3.

Figure 3:
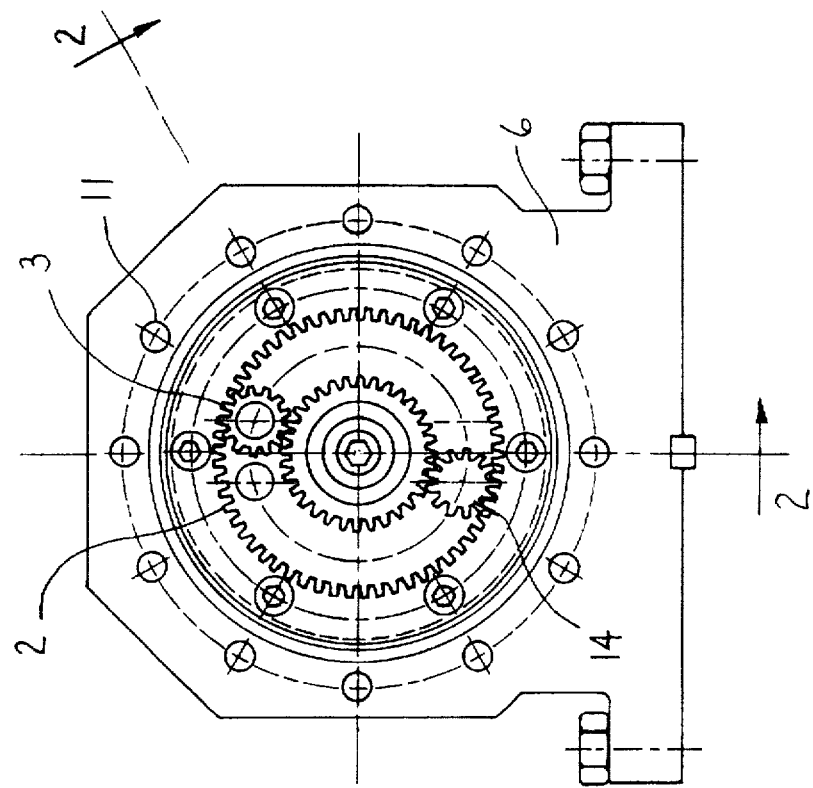
FIG. 3 shows a cross section through the gear according to FIG. 2 along cutting line CD.
Figure 2:
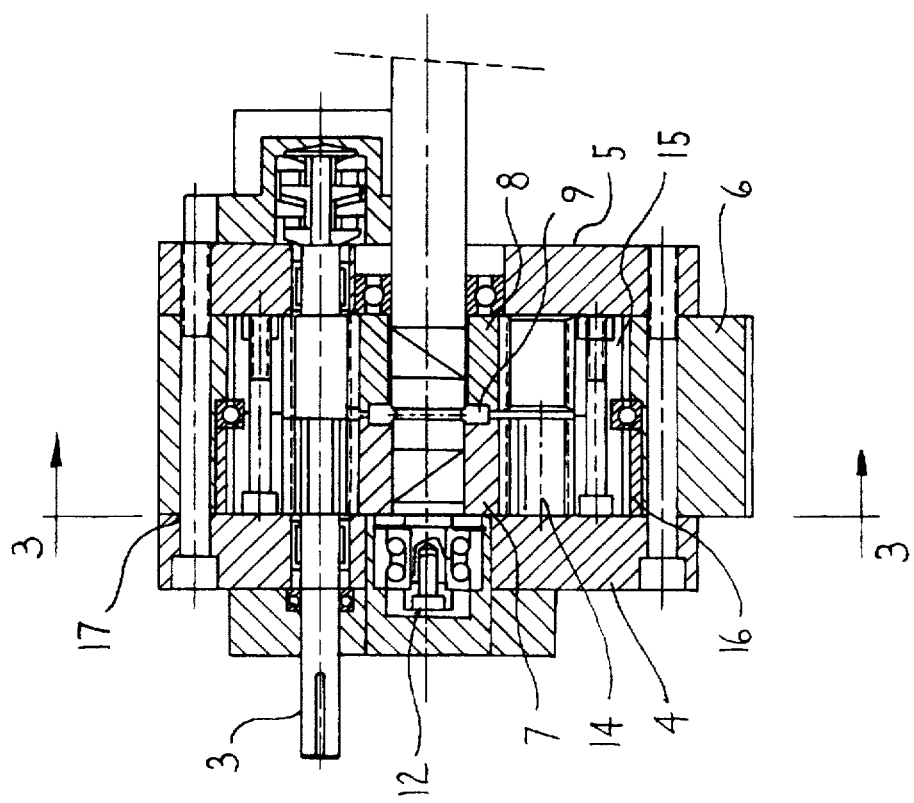
FIG. 2 shows an embodiment of the novel gear in longitudinal section along cutting line AB in FIG. 3.

Driving toothed wheels 18 and 19 are furthermore coupled with each other via one intermediate pinion disposed in mirror-inverted arrangement with respect to pinions 10 and 11 in each case (FIGS. 2 and 3 showing only intermediate pinion 14) and one internal geared hollow wheel 15 and 16 in each case. Hollow wheels 15 and 16 are coupled nonpositively with each other by means of screws 17 and mounted rotatably in housing body 6. The bores in at least one hollow wheel 15, 16 penetrated by screws 17 are formed as oblong holes. This makes it possible to adjust the two hollow wheels 15 and 16 relative to each other in the circumferential direction upon assembly. This design allows continuous fine adjustment of the center distances between driven pinion shafts 2 and 3.

The toothing of driving toothed wheels 18 and 19, pinions 10 and 11 and hollow toothed wheels 15 and 16 is formed either as spur toothing or as helical gearing.

In the embodiment shown in FIG. 1 the torque is transmitted to each of driven pinion shafts 2, 3 in two ways, on the one hand directly via driving toothed wheels 18, 19 and on the other hand via hollow wheels 15, 16 and the intermediate pinions. For proper functioning of the torque-splitting gear it is necessary not only to adjust the desired center distance but also to set driven pinion shafts 2, 3 at the proper angle of rotation relative to each other.

In the gear shown in FIG. 2 and FIG. 3 driving shaft 1 and driven pinion shafts 2 and 3 (of which only driven pinion shaft 3 can be seen in FIG. 2) are mounted in housing covers 4 and 5 of the housing consisting of housing body 6 and housing covers 4 and 5. The two driving toothed wheels 7 and 8 are disposed in tandem on the end of driving shaft 1 through the intermediary of washer 9. Driving shaft 1 and driving toothed wheels 7, 8 are provided with a herringbone gearing which is formed in such a way that the faces of driving toothed wheels 7 and 8 are pressed against each other axially in the area of washer 9 when torque is exerted on driving shaft 1.

Driving toothed wheels 7 and 8 are provided with a spur toothing. This engages pinions 10 and 11 disposed on driven pinion shafts 2 and 3 so as to rotate therewith. Pinions 10 and 11 are mutually offset axially on driven pinion shafts 2 and 3.

Hollow wheels 15 and 16 are coupled nonpositively with each other by means of screws 17 and mounted rotatably in housing body 6. The bores in at least one hollow wheel 15, 16 penetrated by screws 17 are formed as oblong holes. This makes it possible to rotate the two hollow wheels 15 and 16 continuously relative to each other in the circumferential direction.

Pressure sensor 12 is in contact with the end of driving shaft 1 in housing cover 4. When the torque output on the two driven pinion shafts 2 and 3 is equal, then the axial force exerted by driving shaft 1 on pressure sensor 12 is equal to 0. However if the torque output on driven pinion shafts 2 and 3 is different, for example because one driven pinion shaft is greatly braked or even blocked, then pressure sensor 12 can detect a force which can be used for control, for example for switching off the machine.

In the shown gear different center distances between driven pinion shafts 2 and 3 can be realized in simple fashion. Rough variation of the center distances is done by adjusting pinions 10 and 11 in steps by one or more teeth. Fine adjustment of the center distance can be obtained by the following measures:

1. by continuous adjustment of hollow wheels 15, 16 in the circumferential direction,
2. by use of differently dimensioned washer 9, and
3. by continuous adjustment of the driving toothed wheels relative to each other.

FIG. 3 illustrates the axis-parallel arrangement of driven pinion shafts 2 and 3 and the axially offset arrangement of pinions 10 and 11.

The embodiment of the torque-splitting gear shown in FIGS. 1, 2 and 3 is intended for use with high output torques. An embodiment for use with half torques is shown in FIGS. 4 and 5.

In the embodiment according to FIGS. 4 and 5 a large number of components is the same as in the embodiment according to FIGS. 1, 2 and 3. The difference consists in that driven pinion shafts 2 and 3 with pinions 10 and 11 are driven only by driving toothed wheels 7 and 8.

I claim:

1. A torque-splitting gear having a driving shaft and two axis-parallel driven shafts running in the same sense, the driving shaft and driven shafts being coupled positively with each other by toothed wheels disposed thereon, characterized by:

a) two driving toothed wheels (18, 19) are disposed in tandem on the driving shaft (1) coupled with said shaft so as to rotate therewith and being continuously adjustable relative to each other, b) each of said driven pinion shafts (2, 3) with a pinion mounted thereon (10, 11) meshes with the respective one of the driving toothed wheels (18, 19), c) the driving toothed wheels (18, 19) and the pinions (10, 11) are additionally coupled via one intermediate pinion (13, 14) in mirror-image arrangement with respect to the driven pinion shafts to respective internal geared hollow wheel (15, 16), d) the hollow wheels (15, 16) are selectably coupled firmly together or continuously adjustable relative to each other in the circumferential direction.

2. The torque-splitting gear according to the preamble of claim 1, characterized by:

a) the end of the driving shaft (1) is provided with an external herringbone gearing, b) two driving toothed wheels (7, 8) provided with an internal herringbone gearing are disposed in tandem on the external herringbone gearing, a) a washer (9) is disposed between opposing faces of the driving toothed wheels (7, 8), d) a pinion connected with one of the pinion shafts (2, 3) so as to rotate therewith meshes with each of the driving toothed wheels (7, 8).

3. A torque-splitting gear having a driving shaft and two axis-parallel driven shafts running in the same sense, the driving shaft and driven shafts being coupled positively with each other by toothed wheels disposed thereon, characterized by:

a) the end of the driving shaft (1) is provided with an external herringbone gearing, b) two driving toothed wheels (7, 8) provided with an internal herringbone gearing are disposed in tandem on the external herringbone gearing, c) a washer (9) is disposed between opposing faces of the driving toothed wheels (7, 8), d) end of said driven pinion shafts (2, 3) with a pinion mounted thereon (10, 11) meshes with the respective one of the driving toothed wheels (7, 8).

4. The gear of claim 1, characterized in that the pinions (10, 11) are mutually offset axially by at least the length thereof.

5. The gear of claim 1, characterized in that the intermediate pinions (13, 14) are mutually offset axially by at lest the length thereof.

6. The gear of claim 1, characterized in that it is disposed in a housing consisting of a housing body (6) and two housing covers (4, 5), and the driven pinion shafts (2, 3) are mounted in the housing covers (4, 5) on both sides.

7. The gear of claim 6, characterized in that the driving shaft (1) is mounted in the housing covers (4, 5) and has a pressure sensor (12) disposed on the face thereof.

8. The gear of claim 3, characterized in that the pinions (10, 11) are mutually offset axially by at least the length thereof.

9. The gear of claim 3, characterized in that it is disposed in a housing consisting of a housing body (6) and two housing covers (4, 5), and the driven pinion shafts (2, 3) are mounted in the housing covers (4, 5) on both sides.

10. The gear of claim 9, characterized in that the driving shaft (1) is mounted in the housing covers (4, 5) and has a pressure sensor (12) disposed on the face thereof.

* * * * *

UNITED STATES PATENT AND TRADEMARK OFFICE
CERTIFICATE OF CORRECTION

PATENT NO. : 5,787,766
DATED : August 4, 1998
INVENTOR(S) : Josef BLACH

It is certified that error appears in the above-identified patent and that said Letters Patent is hereby corrected as shown below:

Column 2, line 12; change "AB in Fig. 3" to ---2-2 in Figs. 3 and 5---.
Column 2, line 14; change "CD" to ---3-3---.
Column 2, line 18; change "EF" to ---5-5---.
Column 4, line 33; change "end" to ---each---.
Column 4, line 40; change "lest" to ---least---.
Column 4, line 46; change "Claim 6" to ---Claim 1---.

Signed and Sealed this

Sixth Day of April, 1999

Attest:

Attesting Officer

Q. TODD DICKINSON

Acting Commissioner of Patents and Trademarks